Aug. 2, 1955 — J. C. McMULLEN — 2,714,622
METHOD AND APPARATUS FOR FIBERIZING REFRACTORY MATERIALS
Filed March 3, 1953 — 2 Sheets-Sheet 1

INVENTOR.
JOHN C. McMULLEN

Aug. 2, 1955  J. C. McMULLEN  2,714,622
METHOD AND APPARATUS FOR FIBERIZING REFRACTORY MATERIALS
Filed March 3, 1953  2 Sheets-Sheet 2
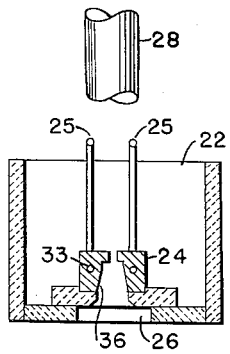
FIG. 5
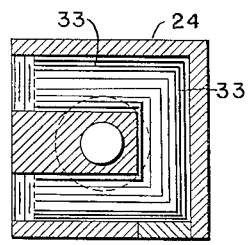
FIG. 7
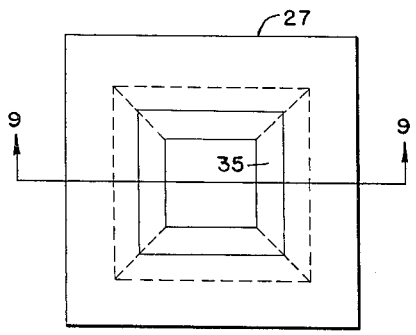
FIG. 8
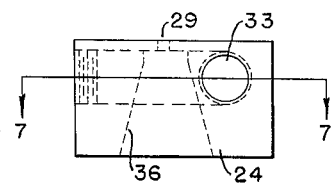
FIG. 6
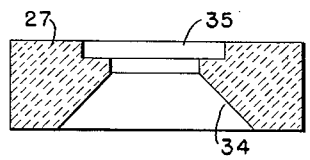
FIG. 9
*INVENTOR.*
JOHN C. McMULLEN
BY

United States Patent Office 2,714,622
Patented Aug. 2, 1955

2,714,622

METHOD AND APPARATUS FOR FIBERIZING REFRACTORY MATERIALS

John C. McMullen, Niagara Falls, N. Y., assignor to The Carborundum Company, Niagara Falls, N. Y., a corporation of Delaware Application March 3, 1953, Serial No. 339,997

12 Claims. (Cl. 13—6)

This invention relates to the releasing of streams of molten inorganic refractory materials and in particular to apparatus and methods for releasing molten refractory material from a melting furnace in a continuous uniform stream.

Inorganic fibrous materials, other than those found in nature such as asbestos, are usually named according to their origin as slag wool, mineral wool or glass wool. Slag or mineral wool products are usually variable in composition and full of impurities and have been commonly made in a cupola by charging the raw materials from which the fibers are to be made together with an adequate amount of coke or other combustible material into the top of the cupola where they are fused or melted as they pass through the cupola to the bottom where they are tapped and blown into fibers. Glass fibers on the other hand have been usually made by melting the materials constituting the glass composition in an ordinary type of glass tank from which the fibers are drawn or a molten stream poured and mechanically converted to fiber form. The formation of slag or mineral fibers by cupola operation has been acceptable because the materials have naturally contained sizeable proportions of impurities other than those introduced by the irregularities of the cupola operation so that the introduction of other impurities from the coke or other combustible material has not been considered objectionable. Moreover, the melting range of the slags or mineral matter has been low enough to permit the production of fibers by ordinary cupola operation without untoward difficulties. The latter has been true also in the making of glass fibers in glass tanks, that is, the melting range of the glass compositions has been low enough to permit easy fusion and fiberization of the material at relatively low temperatures.

However, neither the various slag or mineral wools heretofore available on the market, nor the various compositions of ordinary glass fibers available, have been of adequate resistance to high temperatures to meet the needs for an inorganic refractory fiber of extremely high refractoriness. The difficulties encountered in melting certain highly refractory materials in either a cupola furnace or in a conventional glass tank setup have never been satisfactorily overcome.

To fulfill this need for a highly refractory inorganic fiber, refractory compistions such as those disclosed in U. S. Patent No. 2,557,834, issued to John C. McMullen, have been fiberized. One process for fiberizing these compositions consists essentially of impinging a blast of high velocity gas against a falling stream of molten refractory material being released from a melting furnace, causing fiberizing of the material, provided that the velocity of the impinging stream of gas and the volume and viscosity of the molten material are correct.

The method heretofore employed for releasing the stream of molten refractory material from the melting furnace has consisted of pouring the molten material out of a tilting melting furnace over a dam or lip in the forward wall of a forehearth connected to the furnace. This method of pouring the molten material from the furnace is not entirely satisfactory for several reasons. Firstly, by this method it is extremely difficult to pour a stream at a uniform rate of flow. Since there is a maximum amount of molten refractory material which a given blast of high velocity gas is capable of fiberizing, an excessively high percentage of unfiberized material is produced whenever the rate of the poured stream is too great, resulting in an inferior product. Secondly, by this method it is extremely difficult to pour even a relatively satisfactory stream of molten refractory material for more than a few minutes because a layer of solidified material builds up on the pouring lip. When this solidified layer builds up to such an extent that the poured stream is totally unsatisfactory for fiberizing, it is necessary to discontinue pouring so that the accumulation of solidified material can be removed from the pouring lip. Thirdly, by this method it is extremely difficult to pour a stream of molten refractory material at a fixed location. The changing trajectory of the poured stream, caused by the changing tilting of the melting furnace, and the changing position of the stream from side to side, caused by the uneven buildup of solidified material on the pouring lip, make it almost impossible to keep the blast of fiberizing gas impinging on the fallen stream, resulting in very inefficient production. Lastly, by this method of pouring the molten refractory material over the front wall of the forehearth it is extremely difficult to closely control the temperature of the released material, resulting in unsatisfactory fiberizing whenever the temperature of the stream is not within the range wherein satisfactory fiberizing can be carried on.

It is an object of this invention to provide apparatus and methods for the releasing of a continuous stream of molten inorganic refractory material.

Another object is to provide apparatus and methods for releasing a continuous stream of molten refractory material for subsequent fiberizing.

It is a further object to provide apparatus and methods for releasing a stream of molten refractory material at a regulated rate of flow.

Another object is to release a stream of molten refractory material from a melting furnace at a fixed location.

Still another object is to release a stream of molten refractory material at a regulated temperature for subsequent fiberizing.

Other objects and advantages accruing from practice of the present invention will become apparent as the description proceeds.

It has been found that the above and other objects can be accomplished by releasing the molten refractory material by gravity flow through a cooled orifice after applying a regulated amount of heat to the molten refractory material in an area adjacent to the releasing orifice by means of an arc-heating electrode positioned adjacent the orifice.

It is realized that it is old in the glass-making art to pour molten glass through an orifice. However, that operation does not present the same problems with which the present invention is concerned. Glasses have a viscous working range of as much as 500° C., which range is much longer than the working ranges of the materials used in the practice of the present invention. Furthermore, the working range of glass is over relatively low temperatures, for example from its melting temperature of about 900° C. to perhaps 1400° C. Glass can, therefore, be released through an orifice at a temperature within its working range which temperature is much higher than its solidification temperature, but which temperature is still relatively low. Because of these low working temperatures for glass it can be released through uncooled orifices made of platinum or other material sufficiently refractory to withstand the temperature of the released glass. In fact, in normal practice it has been found desirable to provide the orifice with means for heating the released glass up to the desired temperature. However, even if the orifice were not heated there would be little tendency for it to freeze up. The drop in temperature of the glass when passing through the orifice normally would not be nearly enough to cause solidification of the glass, since the relatively low releasing temperature of the glass is usually much higher than its solidification temperature. Furthermore, because of the extremely wide working range of glass, little difficulty is encountered in maintaining the poured stream within the working range.

In contrast to the extremely long and low temperature working ranges for glasses, the materials with which the present invention is concerned solidify at 1500° C. or more, and have very narrow working ranges within which satisfactory fiberizing can be carried out. Because of these narrow working ranges, the releasing temperatures of the refractory materials cannot be much higher than their solidifying temperatures. For example, a 50% $Al_2O_3$-50% $Si_2$ composition solidifies at about 1825° C. and cannot be fiberized satisfactorily above about 1985° C. Because of the extremely high temperatures of these molten refractory materials, they cannot be released through either heated or uncooled orifices—applicant knows of no structural material possessing sufficient refractoriness which material is insoluble in and non-reactive with these molten refractory compositions at these high temperatures. Therefore, it is apparent that pouring molten material through an orifice as practiced in the glassmaking art is not possible when using refractory compositions of the type with which the present invention is concerned.

This invention can best be understood by reference to the drawings which show a preferred manner of practicing this invention in the producing of fibrous inorganic refractory material, and in which Figure 1 is a side elevation of a melting furnace with the cutaway portion showing the forehearth and releasing apparatus;

Figure 5 is a vertical sectional view along line 5—5 of Figure 3, showing the forehearth and releasing apparatus;

Figure 6 is a side elevation of the releasing orifice block;

Figure 7 is a top section of the releasing orifice block taken along line 7—7 of Figure 6;

Figure 8 is a top plan view of the orifice anchoring block; and

Figure 9 is a section of the orifice anchoring block taken along line 9—9 of Figure 8.

Figure 1:
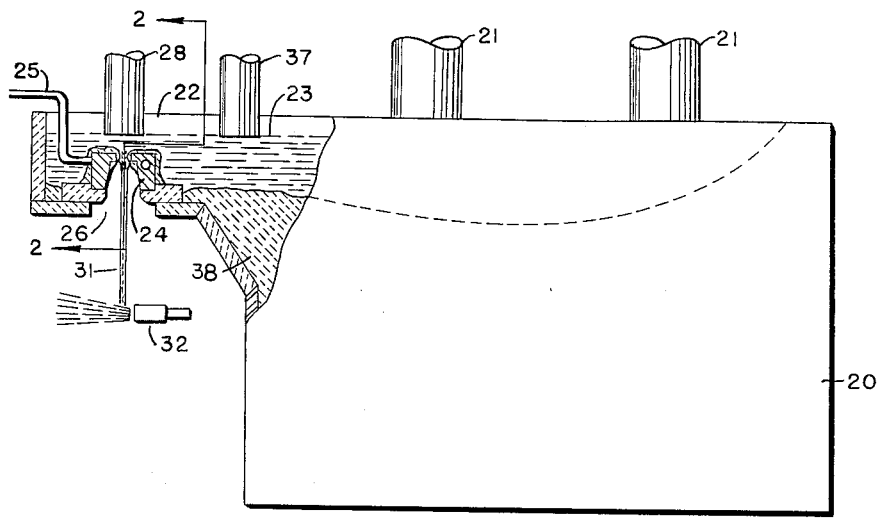
Figure 3:
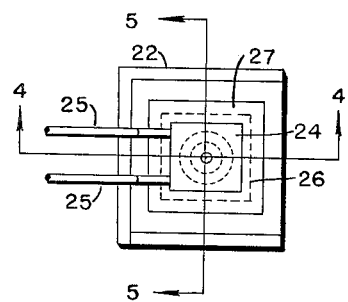
Figure 3 is a top plan view of the forehearth and releasing apparatus, with the electrode left out for clarity.

In the preferred manner of practicing this invention, referring to Figures 1 through 5, refractory material such as that disclosed in U. S. Patent No. 2,557,834, issued to John C. McMullen, is fused in a tilting electric arc open top pot type furnace 20 by electricity introduced through vertically depending heating electrodes 21 suspended above the furnace 20. A forehearth 22 is connected to furnace 20. Raw refractry material is added to the furnace during pouring in sufficient amounts to maintain the level of the molten refractory material 23 sufficiently above the release orifice block 24 during release by gravity of a substantially vertical stream of the molten refractory material 23. Solidified refractory material 38 acts as thermal insulation and electrical insulation for the furnace 20 and forehearth 22. The orifice block 24 is cooled by water or some other fluid introduced through tubing 25 into a cooling duct 33 in the orifice block 24. The orifice block 24 is positioned above a hole 26 through the floor of the forehearth 22 by seating it in a cavity 35 in the orifice anchoring block 27. A temperature control arc-heating electrode 28 depends from above into the molten material in the forehearth 22 and is positioned adjacent and directly over the orifice 29 in the orifice block 24 so that heat will be applied to the molten refractory material in an area adjacent to the orifice, thereby heating the material just prior to its passing through the orifice. Any commonly used means for regulating the power input through electrode 28 and for regulating the position of electrode 28 so as to maintain arc-heating are provided (not shown). The molten refractory material is superheated sufficiently above its solidifying temperature so that it will pass through the cooled orifice 29 without solidifying and plugging up the orifice and so that it will be at the correct temperature for subsequent fiberizing. The temperature of the molten material just prior to entering the orifice and therefore the temperature after passing through the orifice is regulated by changing the power input through temperature control arc-heating electrode 28, which electrode is in a circuit with electrode 37 in the forehearth. Electrode 37 maintains the material molten as it travels from the main bath of molten refractory material 23 in the furnace to the orifice. Electrodes 28 and 37 are preferably on a separate circuit from the heating electrodes 21 for ease of controlling the power input through electrode 28.

Figure 2:
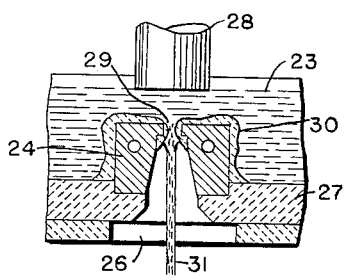
Figure 2 is a vertical sectional view of the orifice along line 2—2 of Figure 1 during the release of the molten refractory material.
Figure 4:
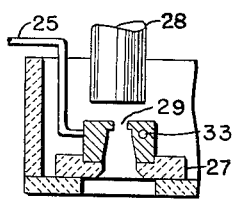
Figure 4 is a vertical sectional view along line 4—4 of Figure 3, showing the forehearth, releasing apparatus, and temperature control electrodes.

Referring specifically to Figure 2, as the molten refractory material 23, superheated in an area adjacent the orifice 29 by temperature control arc-heating electrode 28, passes by the force of gravity through the cooled orifice 29, a protective layer of refractory material solidifies on the surface of the orifice 29 and orifice block 24, forming a refractory ceramic lining 30 for the orifice. This lining 30 insulates the orifice 29 and orifice block 24 from the high temperature of the molten material 23. This lining 30 builds up in thickness until equilibruim is reached between the solidifying effect of the cooling fluid passing through the orifice block 24 and the melting effect on the solidified lining 30 of the hot molten refractory material. The thickness of this lining can be controlled by regulating the power input through the temperature control arc-heating electrode 28 and/or the rate of flow of the orifice coolant, thereby affording a dual control over the effective size of the orifice 29 and so the rate of flow of the molten material through the orifice. This ceramic lining 30 must be maintained sufficiently thick to protect the orifice block 24 from the high temperature of the molten refractory material. Because of the protective lining 30 of solidified refractory material which encrusts the orifice 29 and all parts of the orifice block 24 which are exposed to molten material, there is substantially no corrosion of the orifice 29 or orifice block 24 caused by the extremely high temperature of the molten refractory material 23. Therefore, such an orifice can be used indefinitely although it is made of material which melts at a temperature much lower than the temperature of the molten refractory material 23.

The temperature of the molten stream 31 released from the orifice 29 is affected also by the rate of release of this material. To maintain the released stream at constant temperature, as the rate of release is increased the amount by which the power input exceeds the heat loss from the apparatus must be increased. It is, therefore, apparent that some measure of control over the temperature of the released stream is possible by controlling the effective size of the release orifice. As aforementioned, the effective size of the orifice can be regulated by regulating the rate of flow of coolant through the orifice block 24. Therefore, control of the flow of the coolant provides an additional means of control over the temperature of the released stream.

Since, in this embodiment of the present invention, the molten material is poured through an orifice in the bottom of the forehearth, the path of the released stream 31 is substantially vertical, having substantially no arcuate trajectory as is present in streams poured over a lip in the front wall of a forehearth. It is realized that the direction of the axis of the orifice changes as the furnace is being tilted. However, any horizontal force imparted to the released stream as a result of the axis of the orifice being at an angle to vertical is extremely small, since the angle of the axis to vertical is usually small and the depth of the orifice is small. This small horizontal force is insufficient to impart any substantial arcuate trajectory to the released stream 31, and so the stream has a substantially vertical path.

Furthermore, the released stream 31 of molten refractory material is uniform as to size, and is at the correct temperature for fiberization by a blast of gas from fiberizing nozzle 32 or by any other commonly employed fiberizing means.

Referring now to Figures 6 and 7, in a preferred form of the orifice 29 and orifice block 24, they are machined from a solid block of mild steel about 2¼ inches by 2¼ inches by 1½ inches. Centrally located in a 2¼ inches by 2¼ inches face a hole from ⅜ to ⅝ of an inch in diameter is drilled vertically through the block. This hole is then used as a center hole for an 11/16 inch hole which is drilled from the bottom of the block to within about ⅛ inch of the top face of the block. The sides of this 11/16 inch hole are then tapered from the top of the hole outwardly in a downward direction to a diameter of about 1¼ inches at the bottom surface of the block. The ⅜ to ⅝ inch hole ⅛ inch deep is the orifice 29 and the tapered 11/16 inch hole 36 provides clearance for the released stream of molten refractory material as the furnace 20 is tilted. The cooling duct 33 is made by drilling two ¼ inch duct holes in from the front of the orifice block 24 to within about ⅛ inch of the rear face of the block, the holes being about ¼ inch below the top surface of the block and about ⅛ inch from the vertical hole through the block. A third ¼ inch duct hole is drilled in from one side of the block near the rear of the block so as to intercept the other two duct holes. This hole is then plugged at the surface of the block thereby forming a U-shaped duct 33 in the orifice block 24 around the orifice 29. The open ends of the duct 33 are threaded so as to receive the tubes 25 (shown in Figures 1 and 3 through 5) which introduce cooling fluid into the orifice block 24.

Referring now to Figures 8 and 9, the orifice block 24 is seated in a cavity 35 in the orifice seating block 27 and is thereby positioned above the hole 26 through the forehearth bottom. The cavity 35 in the orifice seating block 27 is dimensioned to fit the orifice block 24. Vertically through the orifice seating block 27 is a hole 34 which is positioned directly below the orifice. This hole 34 tapers outwardly in a downward direction as shown to provide sufficient clearance for the stream of molten refractory material as the furnace is tilted during pouring. The block 27 may be made of any material which is sufficiently resistant to high temperatures and which does not introduce undesirable impurities into the molten bath. For example, this block may be a unitary fused cast aluminum oxide refractory brick cast to the correct dimensions. Although this material will be dissolved slowly by the molten refractory material, it is not a harmful impurity. In some cases it is desirable to cool block 27 by a built in fluid cooling duct, thereby protecting it from the high temperatures of the molten refractory material.

It has been found that vastly superior results are obtained when electric arc-heating is employed to apply heat to the molten material just prior to its passing through the releasing orifice. Electric arc-heating is the method of electric heating characterized by the electricity sparking or arcing across a gap between the electrode and the molten material. A large percentage of the voltage drop is across the gap between the electrode and the molten material, with a relatively small voltage drop across the molten material between the electrodes. Because of this large voltage drop across the gap between the electrode and molten material a large percentage of the power input occurs at the arc area, resulting in a great amount of heat being evolved under and adjacent the electrode. This causes a hot spot in this arc area which extends a short distance below and out from the electrode. It is believed that this hot spot or spot of high localized heating is the field within which the power introduced by the arc is transferred to the molten material, which field is substantially fixed for any set of the above-mentioned conditions.

Electric arc-heating is to be distinguished from electric resistance heating, the latter method being characterized by the electrode and the molten material being in actual intimate contact so that no spark or arc is present. There is no great voltage drop across the interface between the electrode and the molten material, but rather almost all the voltage drop is across the molten material between the electrodes. This results in the power input being distributed throughout the material between the electrodes; no hot spot or area of high localized heating results such as that which is formed near the electrode in arc-heating.

The position of the electrode in relation to the surface of the molten material is an essential factor determining whether arc or resistance heating will result. Arc-heating results when the heating end of electrode is above the surface of the molten material bust still is close enough to the surface for the electric current to bridge the gap. Resistance heating results when the electrode is sufficiently submerged in the molten material. However, it has been found that arc-heating occurs not only when the electrode is positioned above the molten material, but also arc-heating appears to occur when the heating end of the electrode is on the surface of the molten material or even slightly submerged in the molten material as much as about one inch. While it is not known exactly why arc-heating rather than resistance heating results when the electrode is on the surface of or even slightly submerged in the molten material, it is believed that the molten material is for some reason repelled from the electrode as a result of the extremely high current density passing from the relatively small electrode surface area submerged. However, as the electrode is further submerged the current density decreases to a point where the molten material is no longer repelled from the electrode, affording intimate contact between the molten material and the electrode resulting in resistance heating. Whether or not this belief as to why arc-heating results when the electrode is on the surface of or slightly submerged in the molten material is correct, the term "arc-heating" as used in the present invention is intended to cover electric heating with the electrode positioned from about 1" above to about 1" below the surface of the molten material.

In arc-heating, as the size of the gap between the electrode and the molten material decreases the voltage drop across the gap decreases and the electrode current proportionately increases. Since the power input varies directly in proportion to the square of the current, the power input increases as this gap between the electrode and the molten material decreases. Therefore, the most effective heating of the material adjacent the orifice is obtained when the gap between the electrode and the molten material is as small as possible. When the electrode is on the surface of or submerged up to about 1" in the molten material the arc gap is the smallest. Therefore, this position of the arc-heating electrode adjacent the orifice gives the most satisfactory superheating of the molten material near the orifice, and is embodied in the preferred practice of the present invention.

Not only is the position of the temperature control arc-heating electrode relative to the surface of the molten material critical, but also, to obtain the beneficial results of the present invention, the position of this electrode relative to the orifice is critical. The position of the arc-heating electrode must be such that the orifice is adjacent the heating end of this electrode so as to be within the hot spot which extends a short distance below and a short distance out from the periphery of this electrode. When the electrode is so positioned, the temperature of the released stream can be accurately controlled by controlling the power input through the arc-heating temperature control electrode, since the temperature of the hot spot under this electrode changes rapidly with any change in power input through this electrode.

The size of hot spot surrounding the arc area under the temperature control arc-heating electrode, and so the maximum distance between the orifice and this electrode, depend upon many factors such as the position of the electrode relative to the surface of the molten material, the power being introduced through this electrode, the composition of the molten refractory material, and the temperature of the molten material before being heated by this electrode. For example, when a 2½ inch electrode is introducing, by this electrode and the other electrode in the circuit with it, about 25 kilowatts into a molten bath of 50% alumina-50% silica with the temperature of the molten material before heating by this electrode being only slightly above the melting temperature and with the electrode just touching the top of the bath, the hot spot extends about 1½ inches below the bottom of the arc-heating electrode and outward about 1½ inches from the periphery of the electrode. Under the same conditions but with the power input being about 100 kilowatts the hot spot extends about 3″ below the bottom of the electrode and about 3″ out from the periphery of the electrode. It is not necessary that the electrode be positioned directly above the orifice, although this is the preferred practice. The beneficial results of the present invention are obtained so long as the orifice is adjacent the arc area so as to be within the hot spot but not too close to the electrode.

It has also been found that the arc-heating temperature control electrode must not be positioned too close to the orifice. When this electrode is too close to the orifice the stream of molten material does not hold in a steady position but wavers to and fro. It is thought that this is caused by a convection effect resulting from the rapid heating of the material next to the electrode. When the orifice is within this convection field, the released stream is unsteady, resulting in unsatisfactory fiberization. The minimum allowable distance between the electrode and the orifice varies depending upon many factors such as the power input adjacent the orifice, being about ½ inch when a 2½ inch electrode is introducing about 25 kilowatts into a 50% alumina-50% silica melt. It is therefore within the scope of the present invention to position the orifice adjacent the arc-heating electrode so as to be within the hot spot but not so close to this electrode to give an unsteady or wobbling stream.

Because of the limitation on the minimum distance between the arc-heating temperature control electrode and the orifice, the minimum allowable depth of the molten bath above the orifice is limited to this minimum distance.

There is also a limit on the maximum allowable depth of the molten bath above the orifice. This maximum allowable depth of the bath above the orifice equals the approximately one inch maximum submersion depth of the arc-heating electrode plus the depth that the hot spot extends below the electrode. Whenever the bath depth is greater than this maximum allowable depth, either the orifice is not within the hot spot or the electrode is submerged so as to give resistance heating.

When the positions of the temperature control arc-heating electrode and the orifice are within the abovementioned desirable critical ranges, vastly superior results are obtained. Perhaps the most beneficial result obtained from so positioning the orifice and electrode is the ability to extremely accurately control the temperature of the released stream. As aforementioned, this is possible because the temperature of the hot spot varies with the power input at the arc area. The same degree of control over the temperature of the released stream is not afforded when resistance heating is employed in the forehearth instead of arc-heating adjacent the releasing orifice. It is believed that one reason why resistance heating does not give the accurate temperature control is that the depth of the path of the electric current through the molten material changes depending on the temperature, and so the electrical conductivity, of the molten material in the various strata above the orifice when resistance heating is used. Also when three phase resistance heating is used in the forehearth, it is believed that the passage of current between the various electrodes fluctuates unpredictably. Because of these fluctuations in the path of the electric current during resistance heating, it is impossible to accurately control the power input to the material about to pass through the orifice, resulting in an inability to accurately control the temperature of the released stream.

There is yet another advantage of positioning the temperature control electrode and the orifice in accordance with the above teachings. Since a large percentage of the power input is concentrated in the arc area adjacent the orifice, the temperature of the resulting hot spot is extremely sensitive to changes in the power input at the arc area. Therefore, the temperature of the hot spot changes almost immediately upon any change in the power input. As a consequence, any tendency for the orifice to plug up can be overcome almost immediately by increasing the power input through the temperature control electrode. In contrast, when resistance heating is used in the forehearth, if the orifice starts to plug up it is extremely difficult to free it from the excessive solidified material, since an increase in power input into the forehearth will be distributed throughout the material in an area between the electrodes, giving no concentration of heat in the material about to pass through the orifice.

Still another advantage of using arc-heating adjacent the orifice is that this method of heating introduces a minimum amount of carbon into the material about to be released for subsequent fiberizing. It is believed that excessive contamination of the molten material by carbon is detrimental to fiber production because of the formation of carbides which cause a decrease of the percentage of fiber formed and embrittle the fiber.

When the orifice block is made of an electrically conducting material it should be electrically insulated from the metal shell of the melting furnace and also from ground. If this is not done there is apt to be flow of electricity from the temperature control arc-heating electrode to the orifice block which can overheat and destroy the orifice block. Furthermore, even though the orifice block is electrically insulated from the furnace shell and ground, there is apt to be some passage of current through the orifice block if it has too great an upper surface area. That is, if the electrical resistance of a path from the electrode through the molten material to the orifice block, horizontally through the orifice block, and then through the molten material to the other electrode in the circuit is of the same general magnitude as the electrical resistance of a path directly between the electrodes through the molten material, some current will run through the orifice block, possibly overheating and destroying it. Therefore, it is desirable to make the orifice block as small as possible. For example, excessive passage of current from the electrode to the orifice block occurred when following the above preferred practice in all respects except that instead of using an orifice block with the preferred 2¼ inches by 2¼ inches top surface dimension an orifice block with the upper surface having the dimensions 8 inches by 10 inches is used. It is believed that if the arc-heating electrode is positioned directly over the orifice, the maximum upper surface area of the electrical conducting orifice block is just slightly greater than the electrode cross sectional area, and preferably no greater in area.

This tendency for the electric current to pass through the orifice block although the orifice block is electrically insulated appears to be much less when arc-heating rather than resistance heating is employed. It is believed that the reason for this is that during arc-heating the electric current passes through a strata relatively close to the surface of the molten material over the orifice, whereas during resistance heating the electric current is apt to pass through a strata at the level of the orifice block and so through the orifice block. This lesser tendency for the electric current to pass through the orifice block during arc-heating is still another advantage of the present invention.

The diameter of the orifice can be varied over a wide range. In general it must be sufficiently large so that after the protective layer of solidified material forms on the orifice during pouring there is still a large enough opening for a substantial stream of molten material to be released. For fiberizing refractory material in accordance with the present invention, the stream of molten material should preferably be at least ¼ inch in diameter, and must be at least ⅛ inch in diameter. Therefore, the orifice diameter must be greater than ⅛ inch. The orifice can be as large as desired, being limited by the size of stream which the fiberizing means can fiberize. Very satisfactory results have been obtained with the orifice from ⅜ inch to ⅝ inch in diameter.

When using an orifice and orifice block of the general shape disclosed in the preferred practice and other comparable shapes, it is desirable that the orifice depth be small, preferably not to exceed ⅛ of the diameter of the orifice. By orifice depth is meant the depth of the part of the hole through the orifice block which will be in actual contact with the molten material. Therefore, if an orifice of the above-mentioned design is ½ inch in diameter, the orifice depth preferably is ¹⁄₁₆ inch or less. If the depth of such an orifice is not maintained within this limitation, solidification of the molten material is apt to occur plugging up the orifice.

While the specific example hereinbefore set forth describes the preferred manner of practicing this invention it is to be pointed out that the invention is susceptible to many modifications. For example, the orifice block can be made in numerous shapes and sizes. It can be made of almost any highly heat conductive water-tight material such as metals and metalloids, and can be cast or fabricated from plate stock as well as machined from a solid block. If highly heat resistant material is used to construct the orifice block it has the added advantage that, if the orifice should plug up with solidified material, the velocity of the orifice block coolant can be temporarily reduced without excessive damage to the orifice, causing the solidified material which is plugging the orifice to be fused, thereby unplugging the orifice. Furthermore, it is not essential that the hole through the orifice block be tapered outwardly in a downward direction. While this design is advantageous when pouring from a tilting furnace, in other manners of practicing this invention inversely tapered and cylindrical holes are desirable.

While it is preferred to employ an orifice anchoring block for ease of installing and positiveness of positioning the orifice, as well as for insulating the orifice block from the melting furnace shell, this element can be omitted. In such a case the orifice block can rest in a cavity in a forehearth wall, or can be anchored positively to a forehearth wall, just so long as it is electrically insulated from the furnace shell and ground, if made of electrically conductive material.

As a coolant for the orifice block, while water is highly satisfactory, many other conventional cooling fluids such as air or mercury can be used.

While this invention has been described as it relates to pouring through only a single orifice and having only a single arc-heating temperature control electrode in the forehearth, it is within the scope of this invention to have a plurality of orifices in combination with two or more arc-heating electrodes in the forehearth so that a plurality of streams of molten refractory material may be released and fiberized simultaneously.

It is to be understood that, although the preferred practice of the present invention is described as applied to releasing a stream of molten material for subsequent fiberizing, it is contemplated that this invention may be applied to releasing a molten stream for other purposes, such as for blowing pellets and bubbles or for filling casting molds. Therefore, this invention is not to be construed as limited to releasing a stream for fiberizing.

I claim:

1. Apparatus for releasing by gravity for subsequent fiberizing a uniform steady stream of molten refractory material comprising a forehearth, at least one fluid cooled releasing orifice through a wall of said forehearth, said orifice being cooled by means internal of and adjacent the walls of said orifice, and at least one arc-heating electrode depending into said forehearth and positioned so that the heating end of said electrode is from about ½ inch to 3 inches from said orifice.

2. Apparatus for releasing by gravity a uniform steady stream of molten refractory material at least ⅛ inch in diameter comprising a forehearth, at least one fluid cooled releasing orifice through a wall of said forehearth, said orifice being cooled by means internal of and adjacent the walls of said orifice, and at least one arc-heating electrode depending into said forehearth and positioned so that said orifice is adjacent the heating end of said electrode so as to be within the hot spot which extends a short distance below said electrode and a short distance out from the periphery of said electrode when power is being introduced into the molten material by this electrode by arc-heating.

3. Apparatus for releasing by gravity for subsequent fiberizing a uniform steady substantially vertical stream of molten refractory material at a temperature above 1500° C., comprising a forehearth, at least one fluid cooled releasing orifice through the floor of said forehearth, said orifice being cooled by means internal of and adjacent the walls of said orifice, and at least one arc-heating electrode depending from above into said forehearth and positioned so that said orifice is adjacent the heating end of said electrode so as to be within the hot spot which extends a short distance below said electrode and a short distance out from the periphery of said electrode when power is being introduced into the molten material by this electrode by arc-heating.

4. Apparatus for releasing by gravity for subsequent fiberizing a uniform steady substantially vertical stream of molten refractory material at a temperature above 1500° C. comprising a forehearth, at least one fluid cooled releasing orifice through the floor of said forehearth, said orifice being cooled by means internal of and adjacent the walls of said orifice, and at least one arc-heating electrode depending into said forehearth and positioned so that the heating end of said electrode is from about ½ inch to 3 inches from said orifice.

5. Apparatus for releasing by gravity a uniform steady substantially vertical stream of molten refractory material at least ⅛ inch in diameter at a temperature above 1500° C. comprising a forehearth, at least one releasing orifice through the floor of said forehearth, at least one arc-heating electrode depending into said forehearth so that the heating end of said electrode is from about ½ to 3 inches from said orifice, means for controlling the power input through said electrode, and means internal of and adjacent the walls of said orifice for fluid cooling said orifice a regulated amount.

6. Apparatus for releasing for subsequent fiberizing a uniform steady stream of molten refractory material comprising a forehearth, at least one fluid cooled releasing orifice through a wall of said forehearth, said orifice being cooled by means internal of and adjacent the walls of said orifice, at least one arc-heating electrode depending into said forehearth and positioned so that the heating end of said electrode is from about ½ inch to 3 inches from said orifice, and means for regulating the position of said electrode so as to maintain arc-heating.

7. The method for releasing a uniform steady stream of molten refractory material at the correct temperature for subsequent fiberizing comprising applying by arc-heating a regulated amount of heat to the molten material just prior to its passing through at least one releasing orifice, releasing the molten material through said orifice, cooling said orifice a regulated amount, and forming a layer of solidified refractory material on the surfaces of said orifice.

8. The method for releasing at a substantially fixed location a uniform steady substantially vertical stream of molten refractory material at least ⅛ inch in diameter at a temperature over 1500° C. comprising applying by arc-heating a regulated amount of heat to the molten material just prior to its passing through at least one releasing orifice, releasing the molten material through said orifice, cooling said orifice a regulated amount, and forming a layer of solidified refractory material on the surfaces of said orifice.

9. The method for releasing at a substantially fixed location a uniform steady stream of molten refractory material at the correct temperature for subsequent fiberizing comprising applying by arc-heating a regulated amount of heat to the molten material just prior to its passing through at least one releasing orifice, releasing the molten material through said orifice, cooling said orifice a regulated amount, forming a layer of solidified refractory material on the surfaces of said orifice, and positioning and regulating an electrode so as to maintain arc-heating between said electrode and the molten material adjacent said orifice and so as to maintain said orifice within the hot spot which extends a short distance below said electrode and a short distance out from the periphery of said electrode when power is being introduced into the molten material by this electrode by arc-heating.

10. The method of forming refractory fibrous material comprising melting refractory material, applying by arc-heating a regulated amount of heat to the molten material just prior to its passing through at least one releasing orifice, releasing the molten material through said orifice, cooling said orifice a regulated amount, forming a layer of solidified refractory material on the surface of said orifice, and subsequently fiberizing said molten material.

11. The method of forming refractory fibrous material from materials having a melting temperature over 1500° C. comprising melting refractory material, applying by arc-heating a regulated amount of heat to the molten material just prior to its passing through at least one releasing orifice, releasing the molten material through said orifice in a uniform steady substantially vertical stream at a substantially fixed location, cooling said orifice a regulated amount, forming a layer of solidified refractory material of sufficient thickness to protect the orifice from the temperature of the molten material on the surfaces of said orifice, positioning and regulating an electrode so as to maintain arc-heating between said electrode and the molten material adjacent said orifice and so as to maintain said orifice within the hot spot which extends a short distance below said electrode and a short distance out from the periphery of said electrode when power is being introduced into the molten material by this electrode by arc-heating, and subsequently fiberizing the released stream of molten refractory material.

12. Apparatus for releasing by gravity for subsequent fiberizing a uniform steady stream of molten refractory material comprising a forehearth, at least one fluid cooled releasing orifice through a wall of said forehearth, said orifice being cooled by means internal of and adjacent the walls of said orifice, said orifice walls being a highly heat conductive water-tight material, and at least one arc heating electrode depending into said forehearth and positioned so that the heating end of said electrode is from about one-half inch to three inches from said orifice.

References Cited in the file of this patent

UNITED STATES PATENTS

| | | |
|---|---|---|
| 469,454 | Rogers | Feb. 23, 1892 |
| 617,748 | Hurley | Jan. 17, 1899 |
| 686,836 | Ruthenburg | Nov. 19, 1901 |
| 1,458,522 | Clark | June 12, 1923 |
| 2,014,615 | Ferguson | Sept. 17, 1935 |
| 2,165,318 | Thomas et al. | July 11, 1939 |
| 2,181,030 | Thomas | Nov. 21, 1939 |
| 2,186,718 | Ferguson | Jan. 9, 1940 |
| 2,188,927 | Slayter | Feb. 6, 1940 |
| 2,215,982 | Slayter et al. | Sept. 24, 1940 |
| 2,257,767 | Slayter et al. | Oct. 7, 1941 |
| 2,303,657 | Parsons | Dec. 1, 1942 |
| 2,335,135 | Staelin | Nov. 23, 1943 |
| 2,557,834 | McMullen | June 19, 1951 |
| 2,649,487 | Phillips | Aug. 18, 1953 |
| 2,686,821 | McMullen | Aug. 17, 1954 |